(12) United States Patent
Michel et al.

(10) Patent No.: US 10,150,223 B2
(45) Date of Patent: Dec. 11, 2018

(54) CONTROL SYSTEM WITH A HANDLING KNOB

(71) Applicant: Delphi Technologies, Inc., Troy, MI (US)

(72) Inventors: Johann Michel, Strasbourg (FR);
Vincent Isquierdo, Strasbourg (FR);
Etienne Aufrere, Giespolsheim (FR);
Nicolas Jantet, Strasbourg (FR)

(73) Assignee: DELPHI TECHNOLOGIES, INC., Troy, MI (US)

( * ) Notice: Subject to any disclaimer, the term of this patent is extended or adjusted under 35 U.S.C. 154(b) by 0 days.

(21) Appl. No.: 15/513,592

(22) PCT Filed: Aug. 5, 2015

(86) PCT No.: PCT/EP2015/068076
§ 371 (c)(1),
(2) Date: Mar. 23, 2017

(87) PCT Pub. No.: WO2016/050394
PCT Pub. Date: Apr. 7, 2016

(65) Prior Publication Data
US 2017/0293319 A1    Oct. 12, 2017

(30) Foreign Application Priority Data
Sep. 30, 2014   (FR) ..................... 14 59323

(51) Int. Cl.
*G06F 3/0362* (2013.01)
*B26B 15/00* (2006.01)
(Continued)

(52) U.S. Cl.
CPC .............. *B26B 15/00* (2013.01); *A01G 3/037* (2013.01); *G05G 1/08* (2013.01); *G05G 9/047* (2013.01);
(Continued)

(58) Field of Classification Search
CPC ............ B60K 2350/1004; B60K 37/06; B60R 11/0264; B60R 2011/0007;
(Continued)

(56) References Cited

U.S. PATENT DOCUMENTS 4,085,301 A   4/1978 Smith
4,349,708 A   9/1982 Asher
(Continued)

FOREIGN PATENT DOCUMENTS

EP   0 056 315 A1   7/1982
EP   0 855 668 A2   7/1998
WO   02/089047 A1   11/2002

*Primary Examiner* — Kenneth Bukowski
(74) *Attorney, Agent, or Firm* — Lawrence D. Hazelton

(57) ABSTRACT

A control device intended for a user to choose and select functions in a vehicle includes a knob that can be manipulated in rotation about a main axis with respect to a fixed support. The knob comprises a neutral position in which the main axis coincides with a neutral axis that is fixed with respect to the support. The control device also comprises a printed circuit board on which the knob and at least one direction sensor are fixed. The printed circuit board is mounted with the ability to pivot with respect to the support about an axis transverse overall to the neutral axis so as to come to occupy at least a first activated position in which the main axis is inclined with respect to the neutral axis when the knob is moved in a direction orthogonal to the neutral axis. The direction sensor is intended to detect the activated position.

6 Claims, 3 Drawing Sheets

(51) Int. Cl.
*A01G 3/037* (2006.01)
*G06F 3/0338* (2013.01)
*G05G 1/08* (2006.01)
*G05G 9/047* (2006.01)
*G05G 21/00* (2006.01)

(52) U.S. Cl.
CPC .......... *G05G 21/00* (2013.01); *G06F 3/0338* (2013.01); *G06F 3/0362* (2013.01); *G05G 2009/04781* (2013.01)

(58) Field of Classification Search
CPC .. B60R 2011/0089; G05G 9/047; G05G 1/08; G05G 2009/04781; G05G 21/00; G06F 3/0338; G06F 3/0362; H01H 2019/146; H01H 25/008; H01H 25/04; G01C 21/3611
See application file for complete search history.

(56) References Cited

U.S. PATENT DOCUMENTS

| | | | | |
|---|---|---|---|---|
| 5,621,196 A | * | 4/1997 | Nishijima | H01H 25/041 200/4 |
| 5,850,142 A | * | 12/1998 | Rountos | G01D 5/145 324/207.2 |
| 6,080,941 A | * | 6/2000 | Yokobori | G05G 9/047 200/4 |
| 6,293,160 B1 | * | 9/2001 | Shigemoto | G01L 1/2231 73/862.632 |
| 8,198,555 B2 | * | 6/2012 | Baker | H01H 25/041 200/11 R |
| 2004/0132498 A1 | | 7/2004 | Clabunde et al. | |
| 2004/0189595 A1 | * | 9/2004 | Yuasa | B60K 37/06 345/156 |
| 2004/0233159 A1 | * | 11/2004 | Badarneh | G06F 3/016 345/156 |
| 2007/0159452 A1 | * | 7/2007 | Basche | G06F 3/0362 345/156 |
| 2009/0115748 A1 | | 5/2009 | Tanaka et al. | |
| 2009/0200149 A1 | * | 8/2009 | Yamada | B60K 37/06 200/5 R |
| 2010/0270133 A1 | * | 10/2010 | Baker | H01H 25/041 200/4 |
| 2011/0062007 A1 | * | 3/2011 | Mao | H01H 13/14 200/345 |
| 2012/0267222 A1 | * | 10/2012 | Gohng | G06F 3/016 200/61.54 |
| 2013/0199901 A1 | * | 8/2013 | Kreider | B60K 37/06 200/4 |
| 2014/0043303 A1 | * | 2/2014 | Baker | G06F 3/0362 345/184 |

\* cited by examiner

CONTROL SYSTEM WITH A HANDLING KNOB

CROSS-REFERENCE TO RELATED APPLICATION

This application claims the benefit under 35 U.S.C. § 371 of published PCT Patent Application Number PCT/EP 2015/068076, filed 5 Aug. 2015, claiming priority to French patent application number FR1459323 filed on 30 Sep. 2014, and published as WO2016/050394 on 7 Apr. 2016, the entire contents of which is hereby incorporated by reference herein.

TECHNICAL FIELD OF INVENTION

The invention relates to a control device with knob used in automobiles as a digital control interface.

BACKGROUND OF INVENTION

The multiplicity of the controls to which the driver of a modern vehicle has access is such that numerous interfaces are developed allowing functions to be activated without having to look at the control or one's hands. The user relies only on touch to control a function and can thus remain focused and keep his/her eyes on the road. The control of numerous functions, notably the navigation system, radio, telephone and all the telematics functions, as well as control of the ventilation and air conditioning, is performed through a control screen and a remote interface. The most recently developed navigation interfaces are directional knobs placed on the center console between the passengers seated in the front of the vehicle.

Unlike video game controllers and joysticks, the amplitude of movement of directional knobs for vehicles is limited to just a few millimeters or less. The movements must be reliable and precise so that the user, concentrated on driving, can easily and accurately select and validate the desired function. For more precise and more enjoyable use, a return means continuously returns the knob to a neutral, generally central, position. The front-rear and right-left movements of the knob therefore require that a light and comfortable force be applied in order to overcome the return force. The rotation of the knob is accompanied by a small cyclic force felt by the user. These knobs are produced without any perceptible operational play which would be very unpleasant.

In order to obtain perfect balance between the performance and appearance of the directional knobs for vehicles, numerous complex solutions have been implemented. Many mechanical parts, assembled together, are required in order to allow the directional knob to be driven in rotation, moved in front-rear and left-right movements, and pressed. Today, assembly time and cost constraints no longer make it possible to remain competitive with the existing solutions.

It is thus important to propose a new solution to solve these issues.

SUMMARY OF THE INVENTION

The present invention aims to overcome the drawbacks of the existing solutions by providing a control device for which the number of assembled parts is greatly reduced in the light of the state of the art.

A control device enabling a user to choose and select functions in a vehicle, comprises a knob that can be manipulated in rotation about a main axis with respect to a fixed support. The knob comprises a neutral position in which the main axis coincides with a neutral axis that is fixed with respect to the support. The control device also comprises a printed circuit board on which the knob and at least one direction sensor are attached, the printed circuit board being pivotally mounted relative to the support about an axis generally transverse to the neutral axis so as to occupy at least a first activated position in which the main axis is inclined with respect to the neutral axis when the knob is displaced in a direction orthogonal to the neutral axis. The direction sensor is intended to detect the activated position (PA).

The printed circuit board may include several direction sensors which are arranged about the main axis so as to detect several distinct activated positions about the neutral axis (N).

At least one direction sensor on each side of the printed circuit board may be foreseen.

The first direction sensor may include a contact detecting element cooperating with a bearing surface of the control device placed opposite the sensor, the sensor actuating upon abutment of said contact detecting element with the bearing surface of the control device when the knob pivots in the activated position.

At least one direction sensor may include an elastic return element that biases the knob toward its neutral position from the associated activated position.

The contact detecting element can be of the resistive or capacitive type.

The contact detecting element can also be a pushbutton attached to the printed circuit.

The printed circuit may be arranged in a housing, an inner wall of which forms the abutment surface of the control device. The housing may include an opening through which the knob, secured to the printed circuit board, passes. The housing may also comprise a flexible membrane covering said opening. The knob may include a cap bearing on the membrane, said membrane having elastic properties biasing the knob toward its neutral position from the associated activated position.

The printed circuit board may be pivotally mounted by a ball joint type connection which is arranged between the printed circuit board and the support. The ball joint type connection may include a first connecting element which is secured to the printed circuit board and a second connecting element which is secured to the support.

The support may include a base. The base may include a protrusion on its upper face forming a bearing surface associated with at least one direction sensor, and the second connecting element integrally formed with the upper face of the base.

The printed circuit board can be maintained blocked in rotation about the main axis by a retaining pin arranged on the support and passing through the printed circuit board.

BRIEF DESCRIPTION OF DRAWINGS

Other features, purposes and advantages of the invention will become apparent in light of the detailed description below, made with reference to the accompanying drawings given by way of non-limiting example, and in which.

DETAILED DESCRIPTION

Figure 1:
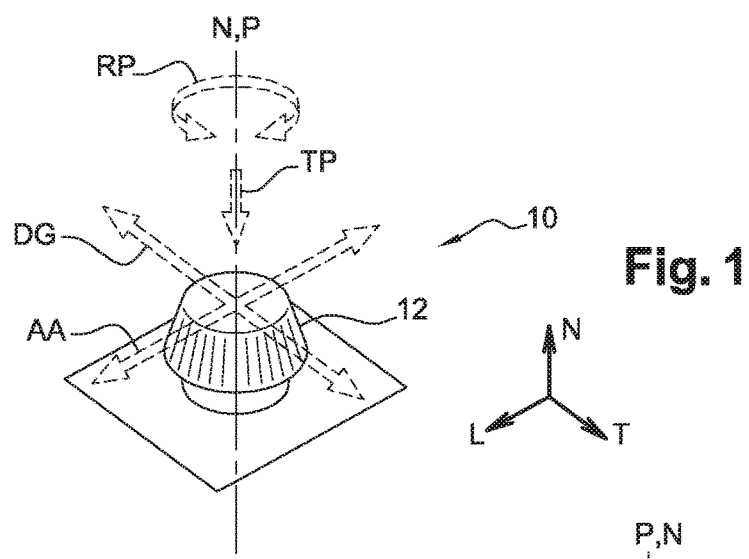
FIG. 1 is a general diagram indicating the possible displacements of the knob of a control device according to the invention.

According to FIG. 1, the invention described is a control device 10 for choosing and selecting functions in a vehicle, these operations being performed by manipulating a knob 12 that is movable within a direct three-axis orthogonal system of axes, a first transverse axis L, a second transverse axis T orthogonal to the first transverse axis L, and a longitudinal neutral axis N. When the knob 12 extends along a main axis P which can may coincide with the neutral axis N, the knob 12 is said to be in the neutral position PN. The knob 12 is said to be in the activated position PA when the main axis P is moved in at least one direction AA orthogonal to the neutral axis N, the main axis P being inclined relative to the neutral axis N.

For the sake of clarity and to make it easier to read, a "low" to "high" orientation such as according to the neutral axis N of the figures may be used, the knob 12 being at the top of the device 10. Also, the directions "front-back" and "right-left" directions will designate the directions according to the first transverse axis L and the second transverse axis T, respectively. Thus, the terms "high", "low", "above", "below", "upper", "lower", "right", "left", "front", "rear" and "horizontal" and "vertical" will be used for the description without limiting the scope of the invention especially in relation to the many possible installations of the device in the vehicle.

The knob 12 has four degrees of freedom which include a so-called right-left DG transverse displacement, corresponding to a pivoting movement about the first transverse axis L, another so-called front-back AA traverse displacement, corresponding to a pivoting movement about the second transverse axis T, a main rotation RP of the knob 12 about the main axis P, and a translation TP about the main axis P corresponding to a vertical pressing movement of the knob 12. The front-back AA and left-right DG displacements are also very small in amplitude. While actually corresponding to pivoting movements, these movements can be seen as small translations. Similarly, the vertical displacement TP is very small in amplitude, equivalent to pressing a key on a computer keyboard. Only the main rotation RP may be a large amplitude motion, or may even not be limited, the knob 12 rotating indefinitely about the main axis P.

In the control device 10 described, the knob 12 has the four degrees of freedom presented above. However, the invention can also be applied to devices not comprising all these possibilities, notably not having translation by pressing, the validation of a function, for example, by pressing a separate button, or having only a transverse displacement. The invention can also be applied to devices comprising other displacement possibilities about other transverse axes, notably about two other transverse axes perpendicular and angularly offset to each other, for example by forty-five degrees, with the first transverse axis L and the second transverse axis T.

Figure 2:
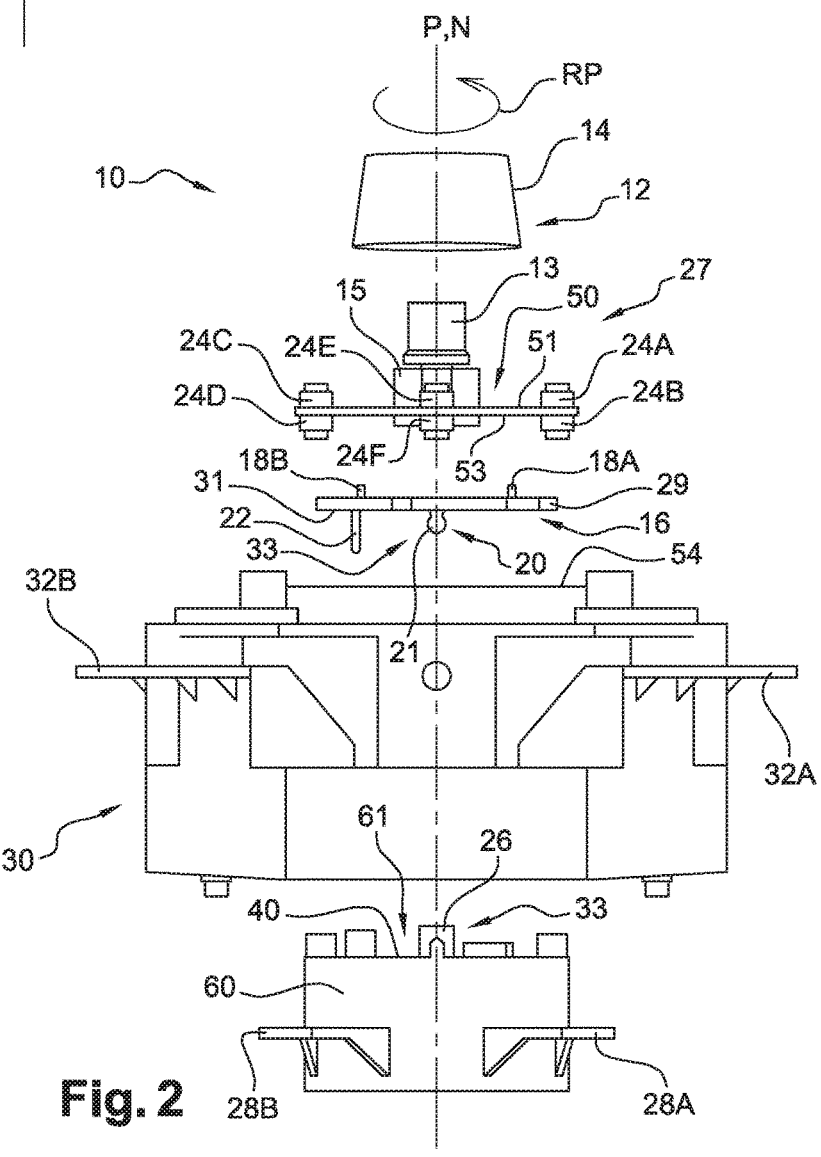
FIG. 2 is an exploded view of the control device according to the invention.

FIG. 2 depicts an exploded view of the control device 10 showing the essential parts of the control device 10.

The control device 10 notably comprises a cap 14 of the knob 12, a position detecting module 27 of the knob 12, a retaining plate 16, a support 60 and a housing 30 of the control device 10.

The position detecting module 27 of the knob 12 comprises a printed circuit board 50, a rotary element 13 of generally cylindrical shape which is arranged at the upper free end of the shaft of a rotary encoder 15 and 8 direction sensors, six of which 24A, 24B, 24C, 24D, 24E, 24F are shown in FIG. 2. The cap 14 is integrally secured to the rotating element 13. The assembly represents the knob 12 of the control device 10.

The printed circuit board 50 has a substantially circular shape. The printed circuit board 50 is substantially orthogonal to the main axis P. The printed circuit board 50 is of double-sided type. The rotary encoder 15 is mounted and connected on the upper face 51 of the printed circuit board 50. The direction sensors 24A, 24B, 24C, 24D, 24E, 24F are arranged in the distal area of the printed circuit board 50.

The direction sensors 24A, 24B, 24C, 24D, 24E, 24F are arranged in pairs. Each sensor 24A of a pair is placed longitudinally aligned with the associated sensor 24B so that a sensor 24A of a pair is located on the upper face 51 of the printed circuit board 50 while the associated sensor 24B of the same pair is located on the underside 53 of the printed circuit board 50. Each pair of direction sensors 24C, 24D is placed at an angular distance of 90 degrees from another pair of direction sensors 24E, 24F.

The retaining plate 16 is provided to support the position detecting module 27. The retaining plate 16 includes a first retaining pin 18A and a second retaining pin 18B on its upper face 29. The first retaining pin 18A and the second retaining pin 18B fit into a first and second opening, not shown, of the printed circuit board 50. These two pins 18A, 18B make it possible to securely hold the printed circuit board 50 on the retaining plate 16 during a primary rotation RP of the knob 12.

The retaining plate 16 also includes a vertical rod 22 on its underside 31, away from the center of the retaining plate 16, facing downward. The vertical rod 22 is inserted into the support 60 of the retaining plate 16 so as to maintain the retaining plate stationary during a primary rotation RP of the knob 12.

The retaining plate 16 also comprises, on its underside 31, a first element 20 of a ball joint type connection 33 comprising a ball 21. The ball 21 is of substantially spherical shape. The ball 21 is arranged in the center of the retaining plate 16 and in the longitudinal alignment of the knob 12.

The support 60 is intended to receive the retaining plate 16. The support 60 comprises two fastening means 28A, 28B, arranged on its periphery. These means 28A, 28B, can be mounting brackets, fastening lugs or any other means for securing the support 60 of the retaining plate 16 on the housing 30. The support 60 of the retaining plate also comprises a base 61 intended to maintain the retaining plate 16.

At the center of its radial surface 40, the base 61 has a second element 26 of the connection 20 of ball joint type 33 forming the counterpart of the first element 20 of the ball joint type connection 33. The second element 26 of the ball joint type connection 33, integrally formed with the base 61, is hollow semi-spherical in shape in which the first element 20 of the ball joint type connection 33. The ball joint type connection 33 further enables the inclination of the printed circuit board 50 when the knob 12 is in the activated position PA, i.e. when the main axis P is moved in at least one orthogonal direction AA to the neutral axis N, the main axis P being inclined with respect to the neutral axis N, enabling it to be maintained in the housing 30.

The housing 30, wherein the support 60, the retaining plate 16 and the printed circuit board 50 are arranged, also comprises two other fastening lugs 32A, 32B notably enabling the control device 10 to be secured in a vehicle. When the support 60, the retaining plate 16 and the printed circuit board 50 are assembled, the cap 14 of the knob 12 remains accessible outside the housing 30 extending past the upper part of the housing 54 so as to be accessible by a user.

In other embodiments, the printed circuit board 50 can have any shape. The number of direction sensors may be reduced to at least one sensor 24A, the direction sensor 24A being placed on the printed circuit board 50, away from the knob 12 and on any transverse axis along which the knob 12 can be inclined. The second element 26 of the ball joint type connection 33 can be secured to the base 61 by bonding or vibration welding, or by any other known fastening process.

Figure 3:
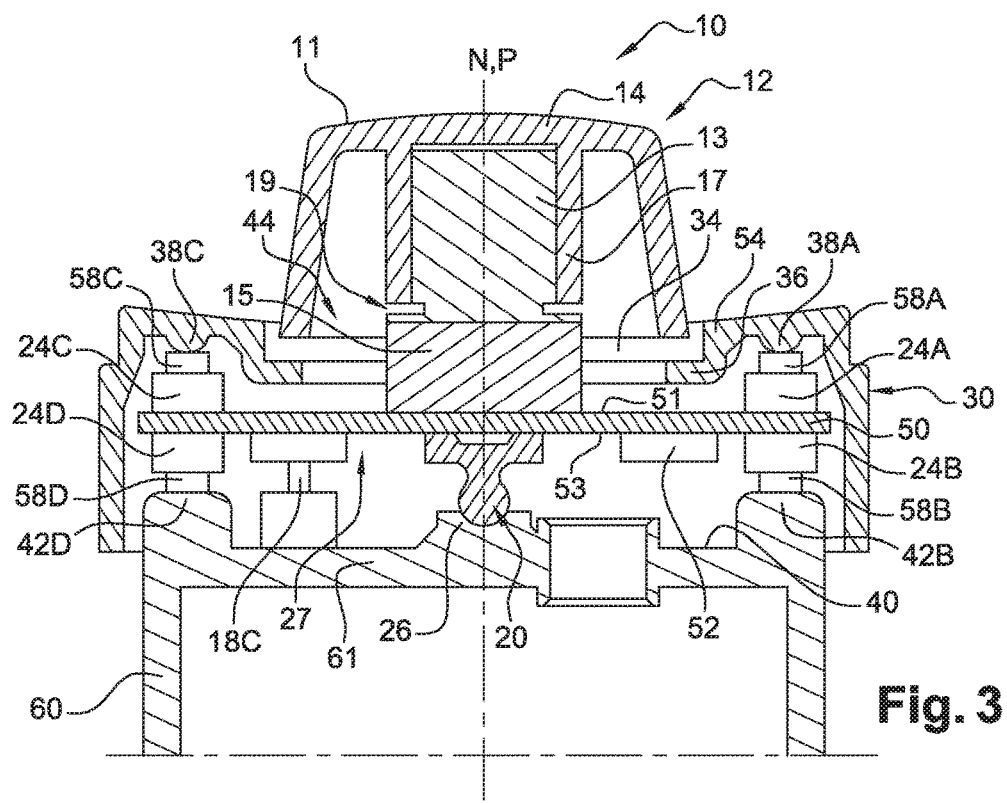
FIG. 3 shows a partial longitudinal sectional drawing of the control device according to the invention in the neutral position.

FIG. 3 represents a longitudinal cross-section of the assembled control device 10. The knob 12 is in the neutral position PN. The control device 10 comprises the cap 14 of the knob 12, the position detecting module 27 of the knob 12, a support 60 of the retaining plate 16 and a housing 30 of the control device.

The cap 14 of the knob 12 is assembled on the rotary member 13. The rotary element 13 is of substantially cylindrical shape and the rotary encoder 15 is also substantially cylindrical. The rotary element 13 and rotary encoder 15 are separated by a hollow groove 19 transversely surrounding the periphery of the rotary element 13. The cap 14 comprises an outer part 11 of substantially cylindrical shape of diameter greater than the diameter of the rotary element 13. The outer part 11 of the cap 14 covers the rotary element 13 of the knob 12, this outer part 11 being manipulated by the user of the control device 10. The cap 14 also comprises a hollow inner ring shaped part 17 extending longitudinally along the rotary element 13 from the upper part of the cap 14 to the hollow groove 19 notably enabling the cap 14 to be secured to the rotary element 13.

The position detecting module 27 comprises the printed circuit board 50, the rotary encoder 15, the first element 20 of the ball joint type connection 33, four direction sensors 24A, 24B, 24C, 24D and a control circuit 52.

The rotary encoder 15, the four direction sensors 24A, 24B, 24C, 24D, the first element 20 of the ball joint type connection 33 and the control circuit 52 are soldered to the printed circuit board 50. The angular position information of the rotary encoder 15 is sent to the control circuit 52 by the electrical contacts of the rotary encoder 15 soldered to the printed circuit board 50 and in connection with the control circuit 52 through the conducting paths of the printed circuit board 50.

The control circuit 52 may be of microcontroller type, of logic circuit type or of electronic topology type that can interpret a signal. The control circuit 52 is used to control functions in a vehicle.

The fourth direction sensors 24A, 24B, 24C, 24D are four pushbuttons, respectively: a first 24A, a second 24B, a third 24C and a fourth 24D pushbutton. Each pushbutton 24A, 24B, 24C, 24D comprises a contact detecting element, called the pusher, respectively: a first 58A, a second 58B, a third 58C, and a fourth pusher part 58D. Each pushbutton 24A, 24B, 24C, 24D is electrically connected by conductive paths of the printed circuit board 50 to the control circuit 52. The pushbuttons 24A, 24B, 24C, 24D are located in the distal area of the printed circuit board 50. The pushbuttons 24A, 24B, 24C, 24D are arranged in pairs which are aligned longitudinally on each side of the printed circuit board 50 so that the first pushbutton 24A is located to the right of the knob 12 on the upper face 51 of the printed circuit board 50 and is longitudinally aligned with the second pushbutton 24B located on the underside 53 of the printed circuit board 50. The third pushbutton 24C is located to the left of the knob 12 on the upper face 51 of the printed circuit board 50, aligned transversely with the first pushbutton 24A and the knob 12, the fourth pushbutton 24D being aligned longitudinally with the third pushbutton 24C and therefore placed on the underside 53 of the printed circuit board 50.

The first element 20 of the ball joint type connection 33 is arranged on the underside 53 of the printed circuit board 50 and is aligned longitudinally with the knob 12. The first element 20 of the ball joint type connection 33 is oriented so as to be housed in the second element 26 of the ball joint type connection 33 of hollow semi-spherical shape of the support 60.

The housing 30 of the control device 10 comprises an opening 44 on its upper part 54 to allow the rotary element 13 of the knob 12 equipped with the cap 14, to remain accessible on the outside of the housing 30. For sealing purposes, the opening 44 is filled by a membrane 34 held between the bottom of the outer part 11 of the cap 14 and a shoulder 36 of the upper par 54 of the housing 30, the shoulder 36 being directed downward. The membrane 34 is said to be maintained clamped between the bottom of the outer part 11 of the cap 14 and the shoulder 36. A first protrusion 38A and a second protrusion 38C of the upper part of the housing 54, semi spherical in shape, are arranged opposite the first pusher 58A and the third pusher 58C placed on the upper face 51 of the printed circuit board 50. A confined space in the order of a few millimeters separates the first protrusion 38A and second protrusion 38C of the first pusher 58A and the third pusher 58C, respectively.

The base 61 also comprises a retaining pin 18C that fits into an opening in the printed circuit board 50. The printed circuit board 50 is blocked in rotation about the main axis P by the retaining pin 18C arranged on the base 61. The upper radial surface 40 of the base 61 comprises a third protrusion 42B of cubic shape and a fourth protrusion 42D of cubic shape, arranged with respect to the second pusher 58B and the fourth pusher 58D. A confined space in the order of a few millimeters separates the third protrusion 42B and the fourth protrusion 42D of the second pusher 58B and the fourth pusher 58D, respectively.

In other embodiments, the rotary encoder 15 can be secured without soldering to the printed circuit board 50, such as for example forcefully pressing additional pins of the rotary encoder 15 into the printed circuit board 50, such as for example by pressing additional pins into the printed circuit board 50, this type pin being referred to as being of press-fit type.

The electrical contact between the electrical contacts of the rotary encoder 15 and the printed circuit board 50 can be solder-free, such as a bearing contact for example, the rotary encoder 15 being held in contact against the printed circuit board 50 by the forcible insertion of additional pins into the printed circuit board 50.

The first element 20 of the ball joint type connection 33 can be secured without solder to the printed circuit board 50, such as by the forcible insertion into the printed circuit board 50 of additional pins of its base for example, such as press-fit type pins, for example. The first element 20 of the ball joint type connection 33 can be part of the retaining plate 16 of the printed circuit board 50 as described in FIG. 2, the first element 20 of the connection possibly being integrally formed with the retaining plate 16.

The two protrusions 38A, 38C of the upper part of the housing 54 and the other two protrusions 42B, 42D of the upper radial surface 40 of the support 60 can be of any geometrical shape. The upper part of housing 54 and the upper radial surface 40 of the support 60 can have no protrusion located opposite the pushers 58A, 58B, 58C, 58D. In this case, the pushers 58A, 58B, 58C, 58D are placed opposite the surfaces of each of the retaining elements of the control device 10, namely the inner surface of the upper part of the housing 54 and the upper radial surface 40 of the support 60. The number of protrusions can also be reduced to at least one protrusion per surface placed opposite the pushers 58A, 58B, such as for example a protrusion of circular type covering the pushers 58A, 58B of the pushbuttons 24A, 24B, placed on the same side of the printed circuit board 50.

The membrane 34 can be secured by vibration or other soldering process on the shoulder 36 of the upper part 54 of the housing 30.

Figure 4:
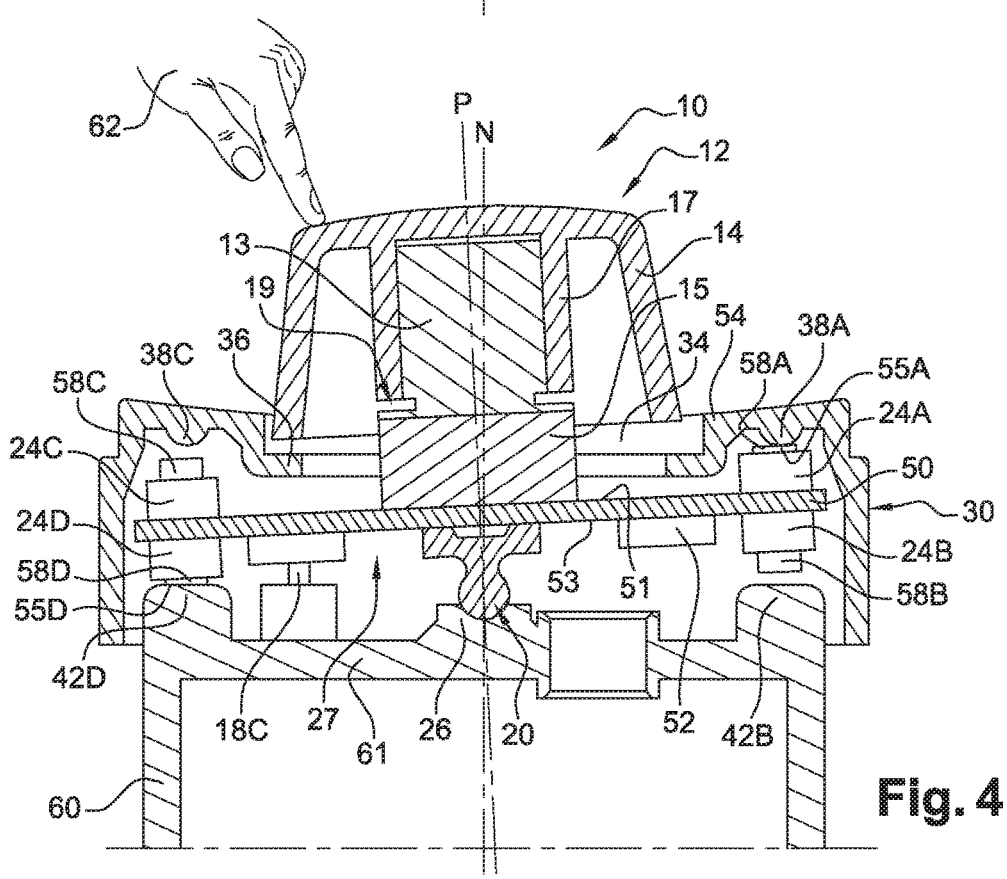
FIG. 4 shows a partial longitudinal sectional drawing of the control device according to the invention in the activated position.

FIG. 4 represents the control device 10 when the knob 12 is in the activated position PA, more precisely when the knob 12, actuated by the hand of the user 62, is in left transverse displacement. For the sake of clarity, only the operation of the control device 10 will be explained for a displacement of the knob 12 along the so-called right-left displacement DG second transverse axis T. It is understood that the operation described for the right-left displacement DG can extend to any other displacement along any transverse axis.

FIG. 4 shows the same elements and the same reference numbers as FIG. 3. In this embodiment where the knob 12 is inclined to the left, the main axis P is moved in an orthogonal DG direction to the left of the neutral axis N, the main axis P being inclined in relation to the neutral axis N. The knob 12, the printed circuit board 50 and the first element 20 of the ball joint type connection 33 are inclined. All of these elements of the device 10 are integral with each other. The first element 20 of the ball joint type connection 33 rotates in the second element 26 of the ball joint type connection 33 of hollow semi-spherical shape in which it is housed. The inclination of the knob 12 to the left and thus the first element 20 of the ball joint type connection 33 causes an inclination of the printed circuit board 50 placed substantially orthogonal to the main axis P. The inclination of the printed circuit board 50 drives the first pusher 58A in abutment with a first bearing surface 55A of the first protrusion 38A of the upper part of the housing 54. Similarly and substantially at the same time, the inclination of the printed circuit board 50 drives the fourth pusher 58D in abutment with a fourth bearing surface 55D of the fourth protrusion 42D. The abutment of the first and the fourth pusher 58A, 58D, causes their depression such that the first and the fourth pushbuttons 24A, 24D activate.

The activation of the first and the fourth pushbuttons 24A, 24D allows the control circuit 52 to correctly identify an inclination of the knob 12 to the left. For detecting an inclination of the knob 12 to the right, a similar operation occurs with the second and the third pusher 58B, 58C when they abut on the second and the third protrusion 42B, 38C.

When the hand of the user 62 no longer presses the knob 12 in activated position PA, the knob 12 is returned to the neutral position PN by the return force of the pressed pushers 58A, 58B. The pushbuttons 24A, 24B are typically designed such that their pusher 58A, 58B returns to the initial position after being pressed via an elastic return element such as a spring.

For example, the first pusher 58A pressed onto the first bearing surface 55A of the first protrusion 38A will exert an elastic force opposite its bearing surface, such that when the hand of the user 62 no longer presses the knob 12 in the activated position PA, the elastic force opposing the pusher 58A pressing on the first bearing surface 55A of the first protrusion 38A will move the pushbutton 24A away, taking the printed circuit board 50 and the knob 12 with it. The knob 12 will return to its neutral position PN substantially orthogonal to the neutral axis N.

Although it is noted that pressing several pushers has the advantage of securing the detection of the inclination of the knob 12 and also to produce a greater elastic force biasing the knob 12 toward its neutral position PN from the associated activated position PA, in other embodiments, the pressing of a single pushbutton 58A may be enough to identify the inclination of the knob 12. The return to the neutral position PN of the knob 12, when the hand of the user 62 no longer urges its inclination, can be facilitated by the membrane 34 which has flexible and elastic properties. When the membrane 34 is compressed between the cap 14 of the knob 12 and the shoulder 36 of the housing when the knob 12 is inclined, the flexible and substantially elastic membrane 34 will exert a force opposite its compression and biasing the knob 12 toward its neutral position PN from the associated activated position PA.

Figure 5:
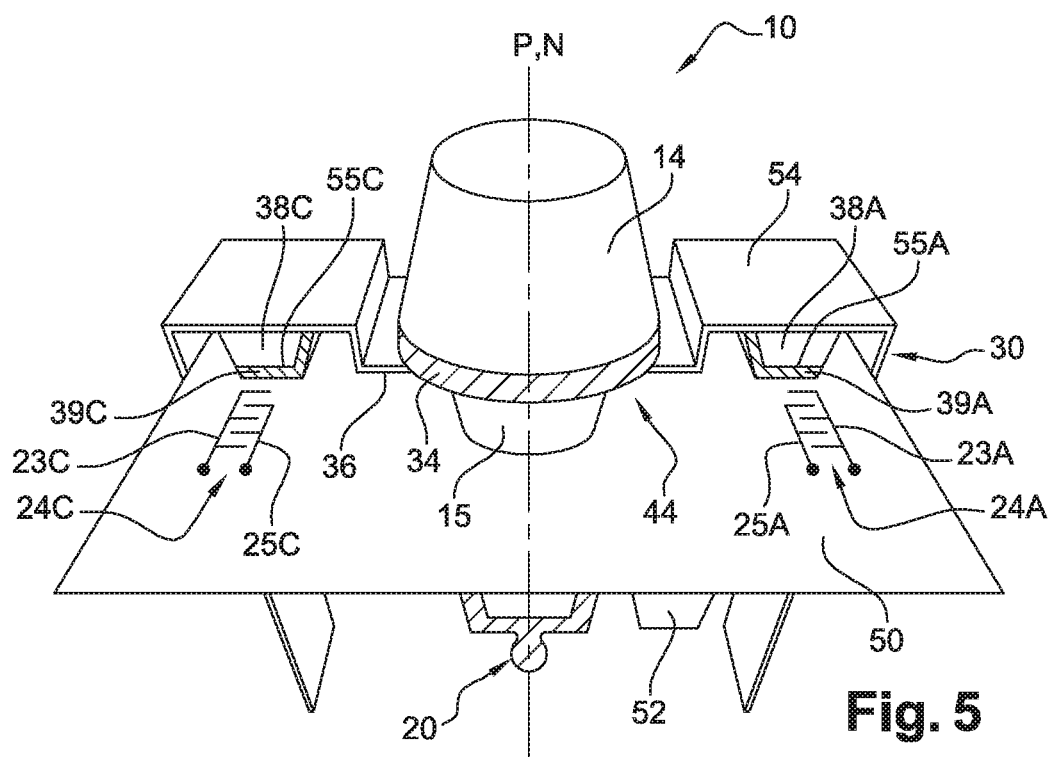
FIG. 5 is an open view of the control device showing a printed circuit of the device according to an alternative of the invention.

FIG. 5 is an open view of the control device 10 showing an alternative to the direction sensors 24A, 24C of the invention. The rest of the arrangement of the control device 10 remains similar to the descriptions shown in the previous figures. The opening 44 of the upper part 54 of the housing 30 of control device 10 allows the rotary element 13 of the knob 12 equipped with the cap 14 to remain accessible on the outside of the housing 30, the rotary encoder 15 of the knob 12 being secured to the printed circuit board 50. The opening 44 of the upper part of the housing 30 is filled by the flexible and elastic membrane 34. The membrane 34 is maintained clamped between the bottom of the outer part 11 of the cap 14 and the shoulder 36 of the upper part 54 of the housing 30.

The first direction sensor 24A and the second direction sensor 24C are alternatives to the pushers 58A, 58C of the pushbuttons 24A, 24C shown in FIG. 3 and FIG. 4. The embodiment shown in FIG. 5 is based on the direction sensors 24A of resistive type. The first direction sensor 24A and the second direction sensor 24C are respectively two first conductive tracks 23A, 25A and two second conductive tracks 23C, 25C arranged in a topology of interleaved combs on the printed circuit board 50. The so-called topology of interleaved combs allows the two conductive tracks 23A, 25A to be close yet not in electrical contact with each other.

Other topologies can be considered for example as a so-called topology of concentric circles. The conductive tracks 23A, 25A, 23C, 25C may be brass tracks, for example.

One of the first two conductive tracks 23A is connected to an electric potential, the other first conductive track 25A is connected to control circuit 52. One of the two second conductive tracks 23C is also connected to a fixed electric potential, the other first conductive track 25C is connected to the control circuit 52. The two first conductive tracks 23A, 25A and the two second conductive tracks 23C, 25C are arranged opposite the first bearing surface 55A of the first protrusion 38A and the second bearing surface 55C of the second protrusion 38C of the upper part of the housing 54. The bearing surfaces 55A, 55C of the first protrusion 38A and second protrusion 38C are equipped with a first conductive element 39A and a second conductive element 39C, respectively. The conductive elements 39A, 39C may be discs made of copper, carbon, or other electrically conductive material.

When the knob 12 is in the activated position PA, more precisely when the knob 12, urged by the hand of the user 62, is in left transversal displacement or in right transversal displacement, one of the conductive elements 39A establishes electrical contact between the two conductive tracks 23A, 23C of the so-called topology of interlaced combs. The electric potential of one of the two conductive tracks 23A is thus in contact with the control circuit 52. The control circuit 52 thus identifies the inclination of the knob 12.

In other embodiments, the direction sensor principle using resistive sensors can be applied to capacitive type sensors. In this case, the contact between the conductive tracks 23A, 23C and the protrusions 38A, 38C leads to a modification of the electrical capacity of the conductive paths 23A, 23C detected by the control circuit 52. More generally, any type of switch that can be operated by pressing contact on a bearing surface can be implemented in the invention.

The return to the neutral position PN of the knob, when the hand of the user 62 no longer urges its inclination, is facilitated by the membrane 34 having flexible and elastic properties. When the membrane 34 is compressed between the cap 14 of the knob 12 and the shoulder 36 of the housing when the knob 12 is inclined, the flexible and elastic membrane 34 will exert a force opposing its compression allowing the knob 12 to return to its initial neutral position PN and thus open the electrical contact between the two conductive tracks 23A, 23C of so-called interlaced comb topology.

Figure 6:
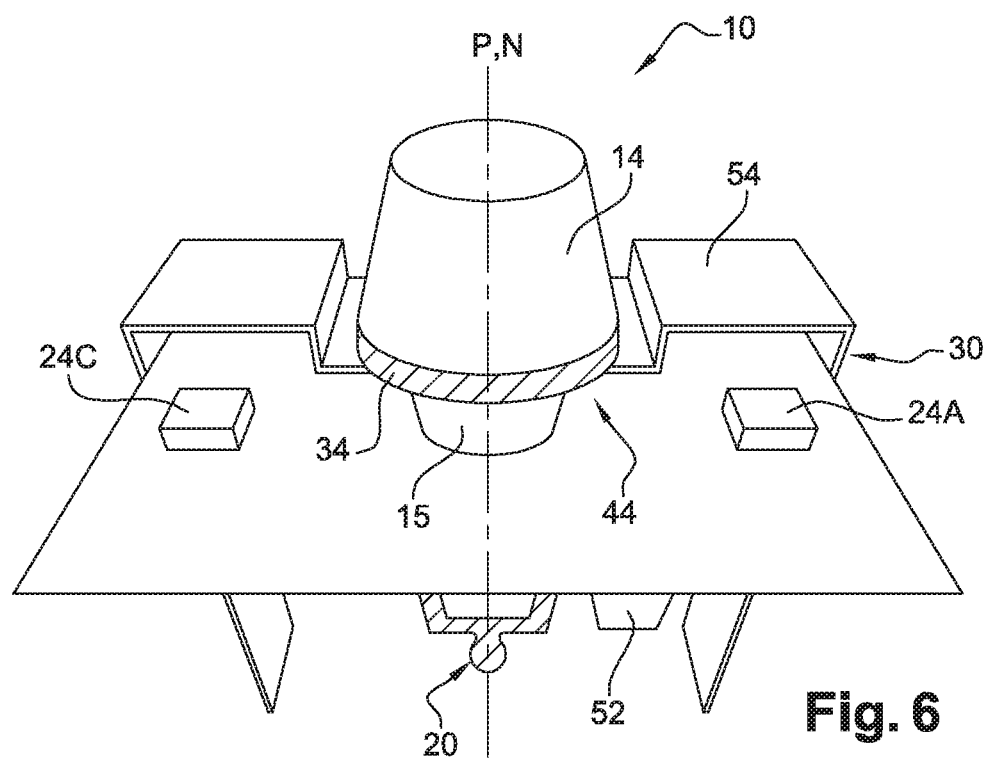
FIG. 6 is an open view of the control device showing a printed circuit of the device according to another alternative of the invention.

FIG. 6 is an open view of the control device 10 illustrating another alternative to the direction sensors 24A, 24C of the invention. The rest of the arrangement of the control device 10 remains similar to the descriptions shown in the previous figures. The opening 44 of the upper part 54 of the housing 30 of control device 10 allows the rotary element 13 of the knob 12 equipped with the cap 14, to remain accessible on the outside of the housing 30, the rotary encoder 15 of the knob 12 being secured to the printed circuit board 50. The opening 44 of the upper part of the housing 30 is filled by the flexible and elastic membrane 34. The membrane 34 is maintained clamped between the bottom of the outer part 11 of the cap 14 and the shoulder 36 of the upper part 54 of the housing 30.

In this embodiment, the first direction sensor 24A and the second direction sensor 24C are inclination sensors capable for example of being gyroscope type, inclinometer type, accelerometer type or of any other technology capable of detecting an inclination soldered to according to a reference. The first and second direction sensor 24A, 24C are soldered to the printed circuit and are electrically connected to the control circuit 52. The control circuit 52 thus identifies the inclination of the knob 12.

The invention claimed is:

1. A control device intended for a user to choose and select functions in a vehicle, the device comprising:
    a knob that can be manipulated in rotation about a main axis with respect to a fixed support, wherein the knob is operable to a neutral position in which the main axis coincides with a neutral axis that is fixed with respect to the support;
    a printed circuit board on which the knob and at least one direction sensor are secured, the printed circuit board being pivotally mounted relative to the support about an axis transverse to the neutral axis so as to occupy several activated positions, wherein the main axis is inclined with respect to the neutral axis when the knob is displaced in several directions orthogonal to the neutral axis;
    a plurality of direction sensors which are arranged on the printed circuit board about the main axis so as to allow the detection of separate activated positions about the neutral axis;
    a housing in which the printed circuit board is arranged, wherein the housing defines an inner wall of which forms the bearing surface of the device, the housing also defining an opening through which the knob, secured to the printed circuit board, passes, wherein the housing includes
    a flexible membrane filling said opening;
    the knob comprising a cap bearing on the membrane, said membrane having elastic properties biasing the knob toward its neutral position from the associated activated position,
    wherein the printed circuit board is pivotally mounted by a ball joint type connection which is arranged between the printed circuit board and the support.

2. The control device as claimed in claim 1, wherein at least one sensor of management is provided on each side of the printed circuit board.

3. The control device as claimed claim 1, wherein the first direction sensor comprises a contact detection element cooperating with a bearing surface of the control device placed opposite the sensor, the sensor operating upon abutment of said contact detecting element with the bearing surface of the control device when the knob pivots in the activated position.

4. The control device as claimed in claim 3, wherein at least one direction sensor includes an elastic return element that biases the knob toward its neutral position from the associated activated position.

5. The control device as claimed in claim 1, wherein the ball joint type connection includes a first connecting element which is secured to the printed circuit board and a second connecting element which is secured to the support.

6. The control device as claimed in claim 5, wherein the first direction sensor comprises a contact detection element cooperating with a bearing surface of the control device placed opposite the sensor, the sensor operating upon abutment of said contact detecting element with the bearing surface of the control device when the knob pivots in the activated position, and wherein the support includes a base, the base including:
    a protrusion on its upper face forming a bearing surface associated with at least one direction sensor, and
    the second connecting element formed integrally with the upper face of the base.

* * * * *